Aug. 15, 1939.  W. J. LUECKEL  2,169,897
COMBINED CONVEYING AND WEIGHING APPARATUS
Filed Jan. 16, 1937  3 Sheets-Sheet 3

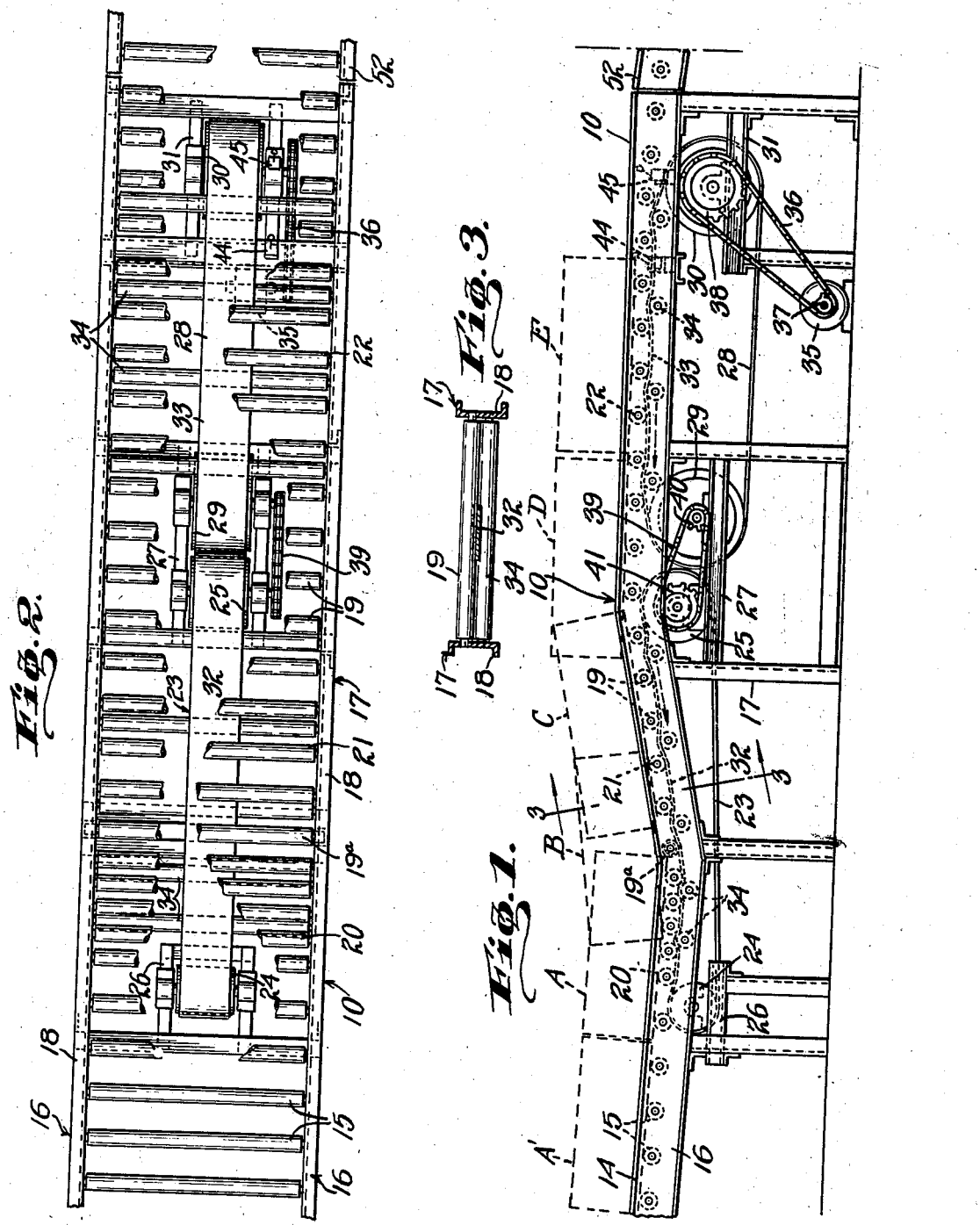

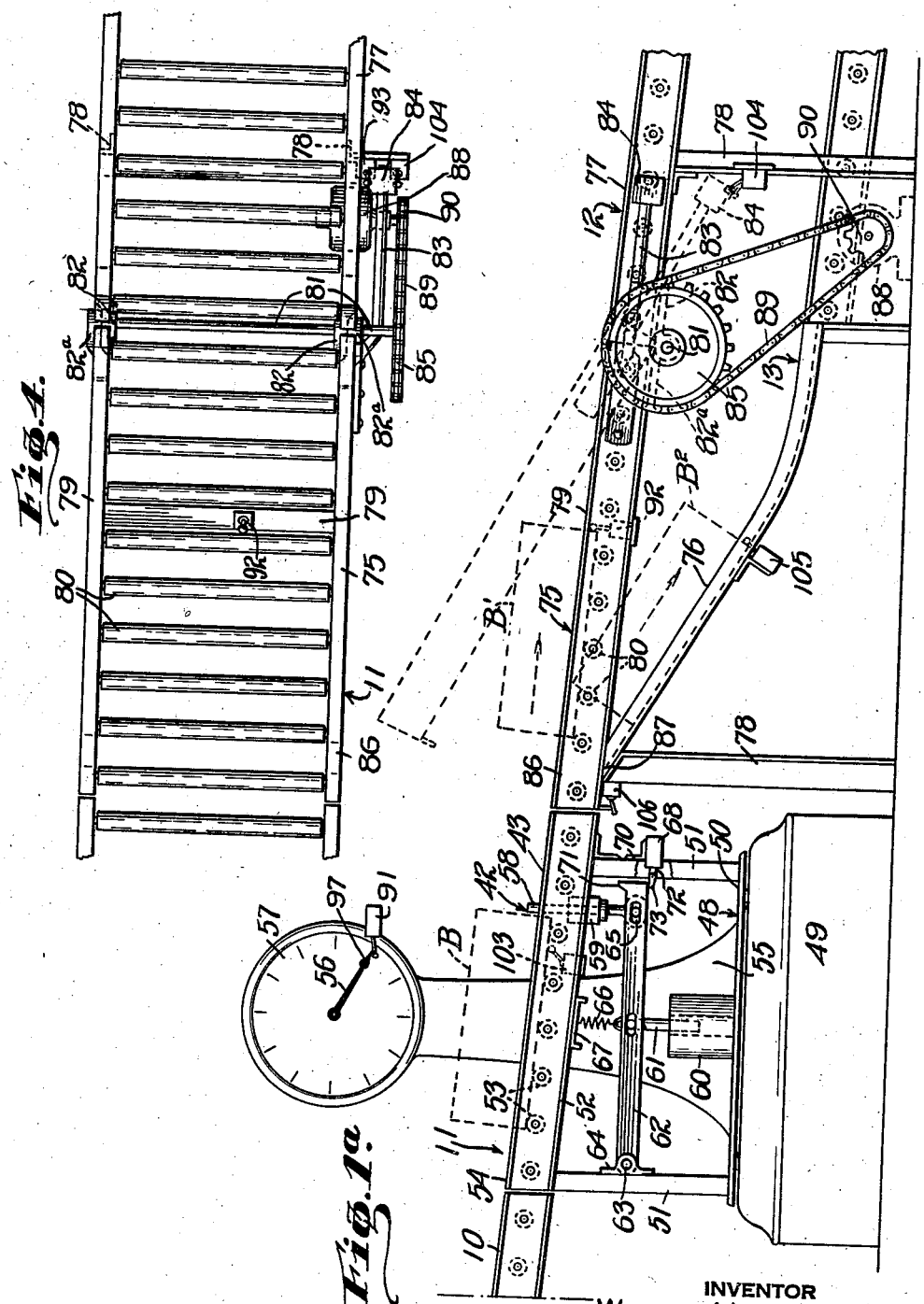

INVENTOR
WILLIAM J. LUECKEL
BY
Conrad A. Dritenick
his ATTORNEY

Patented Aug. 15, 1939

2,169,897

UNITED STATES PATENT OFFICE 2,169,897

COMBINED CONVEYING AND WEIGHING APPARATUS

William J. Lueckel, New York, N. Y., assignor to Dunning Lueckel Engineering Company, New York, N. Y., a copartnership, composed of Harry Dunning and William J. Lueckel Application January 16, 1937, Serial No. 120,930

27 Claims. (Cl. 209—121)

My invention relates to improvements in means for conveying objects, articles or packages and discharging the same over different paths or routes according to the weight thereof, and the same has for its object to provide a simple, reliable and efficient apparatus which operates with accuracy and dispatch and under automatic control to deliver the objects or articles successively to a weighing station to be selectively discharged under control of weighing means.

Further, said invention has for its object to provide an apparatus of the character specified in which the article conveying or delivery means thereof and the route determining means thereof are under control to insure delivery of the article to the weighing station at rates corresponding to the rate of discharge therefrom.

Further, said invention has for its object to provide an apparatus of the character specified in which the article conveying or delivering means and the route determining means thereof are operated and controlled electrically.

Further, said invention has for its object to provide an apparatus of the character specified in which means at the weighing station for stopping the package and retaining the same thereon is controlled to effect the release of the article or package after the weighing operation to allow the discharge thereof over its proper path.

Further, said invention has for its object to provide an apparatus of the character specified in which the article or package conveying means is operated intermittently under automatic control for delivering the articles to the weighing station.

Further, said invention has for its object to provide an apparatus of the character specified in which said package conveying or delivery means is under control of the foremost article or package thereon and of the article retaining or stopping means at the weighing station.

Further, said member has for its object to provide an apparatus of the character specified in which the weighing means thereof controls the discharge of the package of correct or full weight over a predetermined path or route.

Further, said invention has for its object to provide an apparatus of the character specified in which the weighing means thereof controls the package holding or stopping means to release and discharge the package of appropriate or full weight.

Further, said invention has for its object to provide an apparatus of the character specified in which other means at the weighing station controls the apparatus to discharge an article or package deficient in weight over another path or route.

Further, said invention has for its object to provide an apparatus of the character specified in which said last named means also controls the operation of the package retaining or holding means at the weighing station to release the underweight package for discharge over its proper route.

Further, said invention has for its object to provide an apparatus of the character specified in which control means are operated by the discharge of the package over either route to reset the apparatus for the next succeeding weighing operation and to duly deliver the next article or package to the weighing station.

Further, said invention has for its object to provide an apparatus of the character specified in which means at the weighing station actuated by the article or package thereon controls a device for causing a time delayed operation of the means for by-passing the package over another route upon failure of the weighing means to cause the discharge of the package because of deficiency in the weight thereof.

Further, said invention has for its object to provide an apparatus of the character specified in which control means actuated by the packages upon the discharge thereof over the respective paths or routes control the system to restore the package stopping means to operative position and resume the operation of the package conveying or delivering means.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings—

Figure 1 is a side elevation showing the article or package conveying portion of one form of apparatus constructed according to and embodying my said invention;

Fig. 1a is a side elevation showing the weighing and route controlling portion of said apparatus;

Fig. 2 is a plan of the article conveying system shown in Fig. 1;

Fig. 3 is a transverse section thereof taken on the line 3—3 of Fig. 1, looking in the direction of the arrow;

Fig. 4 is a plan view of the portion of the apparatus shown in Fig. 1a;

Figure 5:
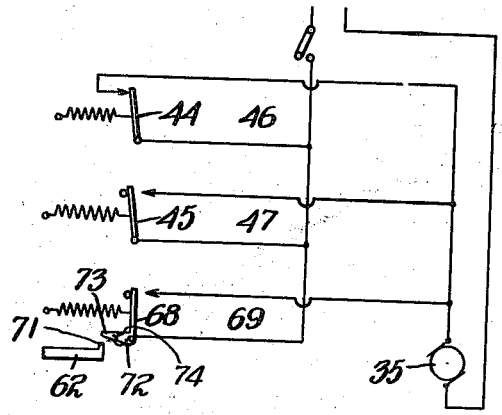
Fig. 5 is a wiring diagram of the circuits for controlling the operation of the conveying means.

Referring to the drawings, the apparatus embodying said invention includes a longitudinally extending conveyor 10 for delivering or feeding the articles or objects, such as packages, boxes, containers, etc. to the checking or weighing means 11 for controlling the discharge of the packages over different paths or routes 12 and 13 so as to segregate underweight articles or packages from those of appropriate weight.

The articles or objects are delivered to the power operated conveyor 10 from the conveyor 14 which is of the gravity feed type and includes a succession of rollers 15 journaled upon a suitable frame 16 in position for delivery of the packages or other articles to the conveyor 10. The conveyor 10 includes a framework 17 having longitudinally extending spaced channel members 18 at the top thereof for rotatably supporting a series of transverse supporting rollers 19. The rollers 19 include a group or section 20 at the delivery end of the conveyor 10 arranged horizontally, an intermediate group or section 21 extending upwardly therefrom at an inclination, and a group or section 22 at the discharge end of the conveyor arranged horizontally but at a higher elevation than the first group. The rollers of groups 20 and 21 are preferably driven by an endless belt 23 disposed about the drums 24 and 25 journaled upon the brackets 26 and 27 secured to the framework 17 below the rollers 19. The rollers of groups 22 are preferably driven by an endless belt 28 disposed about the drums 29 and 30 journaled upon the bracket 27 and a bracket 31 secured to the framework 17 below the rollers at the discharge end of the conveyor. The upper runs 32 and 33 of the belts 23 and 28 are retained in engagement with the lower sides of the rollers 19 by the tension rollers 34 mounted on the lateral supports 18 and engaging the underside of the runs 32 and 33. The belt 28 is driven from the electric motor 35 located below the framework 17 through the transmission belt or other endless member 36 disposed about the pulleys or wheels 37 and 38 secured to the motor shaft and drum 30 respectively. The belt 23 is driven from the drum 29 through transmission belt or other member 39 disposed about the pulleys or wheels 40 and 41 secured to the drums 29 and 25 respectively. The upper runs 32 and 33 of the belts travel in the direction of the arrows towards the package introducing end of the conveyor 10 for imparting rotation to the rollers 19 in the opposite direction to cause the feed of the packages towards the discharge end of the conveyor. The drums and pulleys of respective belts 23 and 28 are relatively proportioned to drive the belt 28 at a greater speed than the belt 23, for example, at three times the speed to rotate the rollers of group 22 at corresponding speed.

The conveyor 10 is coordinated in operation with that of the article-receiving or weighing means 11 to deliver the articles or packages thereto in accordance with the rate of discharge of the packages therefrom. In order to effect said coordination I preferably control the operation of the motor 35, and hence of the conveyor 10 in part by the action of the package itself, and in part by the operation of the article weighing and route controlling means 11, and preferably by the operation of a package stopping or retaining means 42 located upon the weighing station 43. The motor control subjected to the action of the package upon the conveyor 10 comprises the limit switches 44 and 45 disposed upon the framework 17 contiguous to the discharge end of the conveyor 10 and in spaced apart relation longitudinally of the conveyor. As shown in Fig. 5 the switches 44 and 45 are disposed in parallel circuits 46 and 47 including the motor 35. The switch 44 is normally biased to closed position and the switch 45 is normally biased to open position. The switches 44 and 45 are disposed in the path of travel of the foremost package to be actuated thereby successively as hereinafter described.

In operation, the line of packages or other articles upon the gravity conveyor 14 forces the foremost one, as indicated at A' onto the conveyor 10 upon the horizontal portion 20 thereof where the package, indicated at A, bears against the lowermost roller 19a of the inclined group 21. As the motor 35 operates to rotate the rollers 19, the package or box travels to the position B in part overlying the inclined section 21. The package in passing from the horizontal portion 20 of the conveyor to the inclined portion 21 thereof is retarded in speed, as a result of being bounced over the rollers, compared to the speed of travel thereof when the package lies flat upon the rollers of group 21, as indicated at C. This retarding action causes the successive boxes or packages on the conveyor 10 to become separated from each other. When the box at C arrives at the top of the incline 21 it tips to position D upon the high speed section 22, and is pulled away thereby from the next succeeding package at a greater speed to increase the separation thereof from those following. When the package or box reaches the position E, it actuates the switch 44 to open the circuit 46 of the motor 35 and stop the conveyor 10 which resumes operation thereafter as hereinafter described.

The package arriving at the weighing station 43 is supported upon the scale platform 48 of an automatic weighing device 49. The scale platform includes a base member 50 having mounted thereon vertically extending standards 51 supporting at the upper ends thereof the downwardly inclined package supporting chute section 52 including the rollers 53 rotatably mounted on the members 54 secured to the standards. Said chute 52 is positioned contiguous to and in registry with the discharge end of the conveyor 10 for receiving the package therefrom. The movement of the scale platform 48 upon the depression thereof by the package is transmitted through the usual scale mechanism within the scale casing 55 to the pointer 56 pivoted centrally upon the face of the calibrated scale dial 57 for indicating the weight of the package.

The package stopping means 42 includes a pin or stop 58 slidably mounted in a bearing member 59 secured to the supporting members 54 and is adapted to project in the raised position thereof into the path of the package upon the scale chute 52. The pin or stop 58 is actuated by suitable motive means such as the electrically controlled solenoid 60 mounted upon the base member 50 of the scale platform and provided with the core or armature 61 constituting the movable plunger thereof. The operating plunger 61 at the outer end thereof is pivotally connected to the intermediate portion of a horizontally extending lever 62 pivoted at one end 63 to a bracket 64 secured to the forward standards 51 and at its opposite end 65 pivotally connected to the lower end of the pin or stop 58. The lever 62 and stop 58 are normally biased to raised or operative position by the tension spring 66 connected at one end to the lever 62 and at its opposite end to the cross member 67. When the solenoid 60 is energized, the stop 58 is retracted to release the package upon the weighing platform 48 and allow the discharge thereof as hereinafter described.

The operation of the stopping means 42 also causes the actuation of a normally open switch 68 in another parallel circuit 69 (Fig. 5) of the motor 35. Said switch 68 is preferably mounted upon a cross-member 70 secured to the rear standards 51 and is disposed in the path of the free end of the lever 62 to be actuated thereby as the stop 58 resumes its operative position upon the deenergization of the solenoid 60. Upon the upward movement of the lever 62 the enlarged end portion thereof forming a prolonged dwell 71 engages the actuating arm 72 of the switch 68 to move the same to position for closing the parallel circuit 69 for starting the motor 35 and causing the resumption of the conveyor operation. Upon the starting of the conveyor, the package thereon in the position E moves into engagement with the normally open switch 45 to close the parallel motor circuit 47 to maintain the motor circuit closed after the dwell 71 disengages the switch 68 to allow the same to return under spring bias to open position. Upon resumption of the conveyor operation, the foremost package thereon is delivered to the weighing station 43, and the next succeeding package strikes the switch 44 which is then actuated to open the motor circuit 46 to stop the conveyor, the parallel motor circuits 47 and 69 then being also open. Preferably the actuating arm 72 of the switch 68 is provided with a pivoted extension 73 adapted to yield when engaged by the dwell 71 upon the downward movement thereof to prevent closing operation of the switch 68, said arm 72 and said extension 73 having cooperating stops 74 engaging each other to prevent relative movement of the parts when engaged by said dwell 71 upon movement thereof in the opposite direction.

The package B upon the scale chute section 52, if of full weight, is discharged over the movable chute 75 normally in alignment with the scale section 52, and, if deficient in weight, is discharged over the steeply inclined fixed chute 76 located below the movable chute 75 which is then tilted upwardly out of the way. The movable chute 75 normally bridges the chute section 52 and a fixed chute section 77 mounted upon a suitable supporting frame 78. The movable section 75 comprises longitudinally extending side members 79 having a series of rollers 80 mounted therebetween, and the stationary section 77 is similarly constructed. The contiguous ends of the chute 75 and the chute 77 are pivotally connected by means of a shaft 81 journaled within the knuckle members 82 secured to the contiguous end of the chute 77 and keyed within the knuckle members 82ª secured to the contiguous end of the chute 75. The chute 75 has a rearwardly extending arm 83 secured thereto and provided with a weight 84 at the outer end thereof for counterbalancing the chute. A sprocket or pulley 85 is secured to one end of the shaft 81. The free end 86 of the chute 75 in the closed position thereof is adapted to rest upon a ledge 87 at the top of the chute 76 contiguous to the scale chute 52. The chute 75 which constitutes means for allowing underweight packages to be by-passed over the chute 76 is operated by a reversible motor 88 through the chain or belt 89 disposed about the wheel 85 and a corresponding wheel 90 on the motor shaft.

The circuits of the solenoid 60 and motor 88 are controlled to control the operation of the stop 58 and bridging chute 75 by a plurality of switches mechanically actuated in a predetermined order by the weighing means 49, by the pivoted chute 75 in both the open and closed positions thereof and by the package at various points on the paths of travel thereof, the operation of the solenoid in turn controlling the operation of the conveyor 10 as set forth in the foregoing description thereof. The various circuits and the electrical devices therein controlled by said switches are illustrated diagrammatically in Figs. 6 and 7, the circuits of the system being shown in separate diagrams for the sake of clarity.

Figure 6:
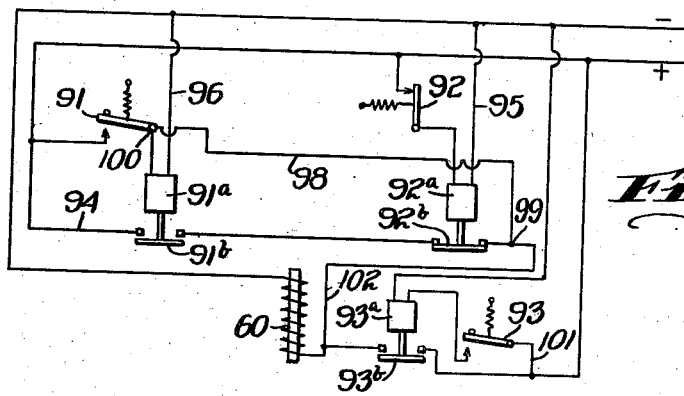
Fig. 6 is a wiring diagram of the circuits for controlling the operation of the package stopping or retaining means at the weighing station.

The switches for controlling the operation of the solenoid 60 include the normally open switch 91 disposed to be actuated by the scale pointer 56 when the same moves to a position on the dial 57 for indicating the proper weight of the package to be tested, the normally closed switch 92 mounted upon the movable chute 75 in position to be actuated by the package when it attains a position B—1 clearing the scale chute 52, and normally open switch 93 mounted upon the framework 78 in position to be actuated by weight 84 on the movable chute when the latter attains open position upon control thereof as hereinafter described. Referring to Fig. 6 the several switches 91, 92, 93 preferably control the circuit of the solenoid 60 by operation of the magnetic device 91ª, 92ª and 93ª, respectively. The magnetic devices 91ª and 92ª when energized actuate the contactors 91ᵇ and 92ᵇ in series relation in the circuit 94 including the coil of the solenoid 60. Since the switch 92 in the circuit 95 of the magnetic device 92ª is normally closed, the latter is energized to retain the contactor 92ᵇ in circuit closing position. The switch 91 controlling the circuit 96 of the magnetic device 91ª is normally open and hence the solenoid circuit 94 remains open at the contactor 91ᵇ. If the package B on the scale platform 48 is of full or proper weight, the pointer 56 moves to the position indicated at 97 to actuate the switch 91 to close the circuit 94 at the contactor 91ᵇ. This operation energizes the solenoid 60 and retracts the pin or stops 58 to allow the package B to slide off of the scale chute 52 onto the chute 75. Inasmuch as the switch 91 opens upon the removal of the package pressure from the scale platform, the magnetic device 91ª is utilized as a holding coil to prevent the return of the stop 58 to operative position before the package clears the weighing platform. To this end, upon movement of the contactor 91ᵇ to circuit closing position another circuit is completed through the magnetic device 91ª by the connection 98 from the circuit 94 at the point 99 beyond the contactor 92ᵇ to the point 100 at the plus side of circuit 96. Hence the contactor 91ᵇ remains closed after the switch 91 opens. When the package thus discharged attains the position B—1 it actuates the switch 92 to deenergize the magnetic device 92ᵇ and open the circuit 94 at the contactor 92ᵇ which deenergizes the solenoid 60 and the magnetic device 91ª. When the package clears the switch 92 the latter again closes to reestablish the normal conditions.

Should the package B be underweight the switch 91 will not be actuated but, under control as hereinafter described, the chute 75 now opens and causes the actuation of the switch 93 which closes the circuit 101 of the magnetic device 93ª which now closes the contactor 93ᵇ in a parallel circuit 102 through the solenoid 60 to energize the same and allow the discharge of the underweight package over the discharge chute 76. Upon return of the bridging chute 75 to closed position, the switch 93 is released and allowed to open deenergizing the solenoid 60.

Figure 7:
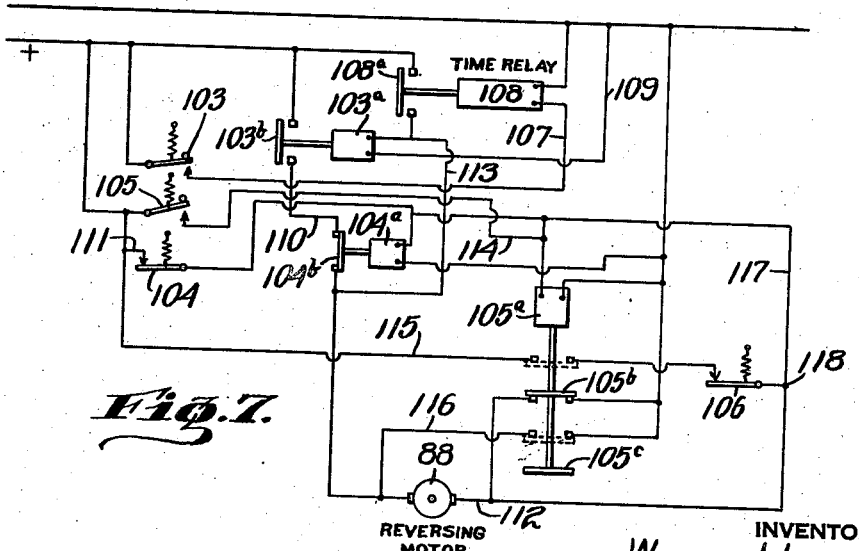
Fig. 7 is a wiring diagram of the circuits for controlling the discharge of the underweight article or package.

The switches for controlling the operation of the reversing motor 88 include the normally open switch 103 disposed upon the scale section 52 in position to be closed by the package thereon for starting the motor, the normally closed switch 104 disposed upon the standard or frame 78 in position to be actuated by the weight 84 when the chute 75 assumes its open position for stopping the motor, the normally open switch 105 located upon the by-passing chute 76 in position to be actuated by the package at B—2 for causing reversing movement of the motor, and the normally closed switch 106 located upon the ledge 87 in position to be opened by the movable chute 75 as the same attains its closed position for stopping the motor and resetting the apparatus. Referring to Fig. 7, the several switches 103—105 preferably control the circuit of the motor 88 indirectly by operation of magnetic devices 103ª to 105ª respectively while the switch 106 preferably operates directly in the motor circuit. The switch 103 when closed by a package upon the scale platform closes the circuit 107 of a time relay 108 set to operate a contactor 108ª after an interval of greater duration than that necessary to weigh a package of full weight and discharge the same over the direct path or the bridging section 75. The contactor 108ª controls the circuit 109 of the magnetic actuator and holding coil 103ª for operating the contactor 103ᵇ adapted to close the circuit 110 to the motor. The switch 104 controls the circuit 111 of the magnetic device 104ª for actuating the contactor 104ᵇ in the motor circuit 110 in series with the contactor 103ᵇ. Should the package B upon the weighing platform 48 be of a weight inadequate to move the dial pointer 56 to position for actuating the switch 91 for energizing the solenoid 60 and releasing the package, the time relay 108 which has in the meantime been set for operation by the switch 103, actuates the contactor 108ª to energize the magnetic device 103ª and close the motor circuit 110 at 103ᵇ. The circuit 110 to the motor at one side is thus completed through the contactors 103ᵇ and 104ᵇ. The circuit from the motor 88 at the opposite side may be traced through the conductor 112 and the contactor 105ᵇ to the negative side of the line. Should the dial switch 91 operate to cause the discharge of a full weight package before the time relay 108 operates, the switch opens to preclude further operation of the relay.

Upon the closing of the contactor 103ᵇ the motor 88 rotates in the direction for swinging the conveyor section 75 upwardly out of the way. Upon actuation of the switch 104 by the weight 84, the magnetic device 104ª is actuated to open the circuit 110 at the contactor 104ᵇ and stop the motor. The weight 84 at the same time actuates the switch 93 to close the circuit of the solenoid 60 and retract the stop 58. In order to insure the operation of the motor 88 until the contactor 104ᵇ opens, upon the closing of the contact 103ᵇ, a circuit is completed through the conductor 110, contactor 104ᵇ and connection 113 through the magnetic device 103ª which then serves as a holding coil. The underweight package upon release thereof in passing down the chute 76 strikes the switch 105 disposed in the circuit 114 of the magnetic device 105ª for restarting the motor 88 to rotate the same in the reverse direction for closing the chute 75. Upon the energization of the actuator 105ª, the contactor 105ᵇ normally in position closing the connection 112 from the motor to negative side of the line is actuated to close the connection 115 from the positive side of the line through the motor 88 in the opposite direction, the make and break 105ᵇ in the line 115 being in series with the switch 106. Upon the actuation of the contactor 105ᵇ, the contactor 105ᶜ movable therewith closes the connection 116 from the opposite side of the motor to the negative side of the line. Upon actuation of the switch 105, the current flows through the connection 115, contactor 105ᵇ, contactor 106, through the motor in the reverse direction, and through connection 116 and contactor 105ᶜ to to the negative side of the line. When the pivoted chute section 75 again closes, the free end thereof engages the switch 106 to open the motor circuit and stop the motor operation.

In order to maintain magnetic device 105ª energized after the package disengages the switch 105 and the magnetic device 104ª energized after the switch 104 is released by the pivoted section 75, said magnetic devices are included in a holding circuit controlled independently of said switches 105 and 104. The holding circuit for this purpose includes a connection 117 from the point 118 in the circuit 115 beyond the switch 106 to the plus sides of the respective electromagnetic devices 105ª and 104ª, which therefore remain energized until the movable section 75 closes and switch 106 opens so as to insure full closing movement of the section. Upon actuation of the switch 106 to open the same said holding circuit 117 is opened to deenergize the devices 104ª and 104ᵇ. The operation places the contact 104ᵇ in circuit closing position in circuit 110, the contactor 105ᵇ in circuit closing position relative to circuit connection 112 and the contactor 105ᶜ in position to open the return connection 116.

The operation of the apparatus will be largely obvious from the foregoing description. Upon the delivery of the foremost package to the weighing station 43, the next succeeding package actuates the switch 44 to stop the conveyor. If the package is of full or appropriate weight the switch 91 is actuated to retract the stop 58 and cause the discharge of the package over the route or path 12. When the package clears the scale section 52, the switch 92 is actuated to deenergize the solenoid 60 to cause the return of the stop 58 to operative position, which movement actuates the switch 68 to close the circuit of the motor 35, start the conveyor 10 and deliver the next package to the weighing station 43. Should the package be underweight the time-delay relay 108 operates to close the circuit of the motor 88 for opening the chute section 75. This operation causes the actuation of the switch 93, for energizing the solenoid 60 to cause the retraction of the stop 58, and the switch 104 is operated to stop the motor 88. Thereupon the package is discharged over the route 13 for delivery to another destination. The package then actuates the switch 105 to start the motor 88 for rotation in the opposite direction to close the chute section 75. This operation opens the circuit of the solenoid 60 to return the stop 58 to operative position and restart the conveyor 10. As the chute section 75 closes the circuit of the motor 88 opens.

By my invention, I am enabled to deliver packages, boxes or other articles to a weighing station and discharge the same therefrom over different routes or paths to separate underweight packages from those that are of full or appropriate weight. The apparatus operates automatically to determine the route that the package is to take and then to release the same for discharge over its proper route. The discharging operation is also effective to resume the operation of the conveyor 10 and deliver another package to the weighing station, the conveyor being automatically stopped when the next succeeding package attains a predetermined position thereon relative to the weighting station.

Having thus described my invention what I claim and desire to secure by Letters Patent is:

1. An apparatus of the character described comprising a weighing station, means for delivering packages or other articles to said weighing station, a plurality of means selectively operated at the weighing station according to the weight of the package for controlling the discharge of packages over different paths, means associated with both of said discharge paths and operated by the passage of an article over either thereof for resetting said discharge controlling means, and means in part under the control of said resetting means for controlling the operation of said delivering means.

2. An apparatus of the character described comprising a weighing station, means for delivering packages or other articles to said weighing station, a plurality of means selectively operated at the weighing station according to the weight of the package for controlling the discharge of packages over different paths, package-actuated means associated with said paths for resetting said discharge controlling means, and means in part under the control of said package-actuated means for controlling the operation of said delivering means.

3. An apparatus of the character described comprising a weighing station, movable feeding means for delivering packages or other articles to said weighing station, means for stopping said feeding means as the package thereon approaches said weighing station, means actuated by the package at the weighing station for controlling the discharge of the packages from said weighing station over different paths, and means disposed in each path and actuated by the package traversing the same for resetting said controlling means and starting the package delivering means.

4. An apparatus of the character described comprising a weighing station, a movable conveyor for delivering packages or other articles to the weighing station, means for actuating said conveyor, means actuated by a package on said conveyor for controlling said actuating means, means actuated by the package at the weighing station for controlling the discharge of the package from the weighing station for movement over different paths, means disposed in said paths and actuated by the packages traversing said paths for resetting said controlling means, and means actuated by said package discharge controlling means for controlling said conveyor actuating means.

5. An apparatus of the character described comprising a weighing station, movable conveying means for delivering a package or other article to the weighing station, means operated by the package at said station for controlling the discharge of the packages over different paths, means disposed in each path and actuated by the package traversing the same for resetting said controlling means, and means controlled by the package on the conveying means and by the resetting operation of said controlling means for controlling the operation of said conveying means.

6. An apparatus of the character described comprising a weighing station, means for delivering packages or other articles to the weighing station, means for actuating said delivering means, means for directing the packages from said weighing station over different paths, control means therefor operated at the weighing station, and means for controlling the operation of said actuating means, said last-named means including control means associated with said delivering means and actuated by the package upon movement thereof into a predetermined position on the conveyor for delivery to said weighing station and control means associated with said discharge paths and actuated by the package upon discharge thereof over either path.

7. An apparatus of the character described comprising a station including weighing means for supporting a package or other article, means for controlling the movement of packages from said weighing station, means at the weighing station actuated by the weighing means when a package is of full weight for operating said movement controlling means to discharge said package over a certain path, and means on said weighing station actuated directly by the package irrespective of weight for differentially operating said movement controlling means to discharge the package over another path, said last-named means becoming operative upon failure of said weight actuated means to operate.

8. An apparatus of the character described comprising a weighing station for supporting a package or other article, means for controlling the movement of packages from said weighing station, means actuated by the weighing action of said station when a package is of full weight for operating said movement controlling means to discharge said package over a certain path, and means on the weighing station actuated by the package and having a delayed action for operating said movement controlling means to discharge the package over another path upon failure of said first-named weight actuated means to operate because of a deficiency in the weight of the package.

9. An apparatus of the character described comprising a weighing station, means for controlling the movement of packages from said weighing station, a plurality of control means at the weighing station for differentially operating said movement controlling means to discharge the packages over different paths, one of said control means being actuated upon a predetermined weighing movement of the station and the other being actuated directly by the package on the station and operating in time-delayed relation to the other, and control means for resetting said movement controlling means.

10. An apparatus of the character described comprising a weighing station, conveying means for delivering packages or other articles to said weighing station, means for controlling the movement of said packages from said weighing station, means actuated by a weighing movement when a package is of appropriate weight at the weighing station for operating said movement controlling means to discharge the package over a certain path, means operated by the package on the weighing station for differentially operating said movement controlling means to discharge the package over another path when the package is deficient in weight, and means disposed in said discharge paths and actuated by the packages discharged over either path for resetting said movement controlling means and controlling the operation of said conveying means.

11. An apparatus of the character described comprising a weighing station, conveying means for delivering a package or other article to said weighing station, means for actuating said conveying means, means at said weighing station for controlling the path of discharge of the article or package from the weighing station, and means associated with said conveying means and the discharge paths under the control respectively of the package conveyed by said conveying means and discharged from said weighing station for controlling the operation of said conveyor actuating means.

12. An apparatus of the character described comprising a weighing station, conveying means for delivering packages or other articles to the weighing station, means for actuating said conveying means, means for controlling the movement of packages from said weighing station, means actuated by the package at the weighing station for operating said movement controlling means to discharge the packages over different paths, means associated with said discharge paths and operated by the packages discharged for resetting said movement controlling means, and means associated with and controlled upon the operation of the delivering and resetting means for controlling the operation of said conveyor actuating means.

13. An apparatus of the character described comprising weighing means, means for conveying packages or other articles to said weighing means, means for retaining said package on said weighing means, means operated by said weighing means for actuating said retaining means to discharge the package over a given path, means for diverting said package over another path, means operated by the package at the weighing means for controlling said diverting means, means operated by said diverting means for actuating said retaining means, control means actuated by the packages traversing said paths for resetting the apparatus, and means controlled upon the resetting operation for causing the operation of said conveying means.

14. An apparatus of the character described comprising a weighing station, conveying means for delivering packages or other articles to the weighing station, means for controlling the movement of the packages from the weighing station, means actuated by the weighing movement of said station when a package is of full weight for operating said movement controlling means to discharge the package over a certain path, means actuated by the package and having a delayed action relative to the action of the weight operated means for operating said movement controlling means to discharge a package deficient in weight over another path, and means controlled upon the delivery and discharge of the packages for controlling the operation of said conveying means.

15. An apparatus of of the character described comprising a weighing station, means at the weighing station for retaining a package or other article, thereon, means including a movable member for directing packages from said weighing station over different paths, control means at the weighing station for actuating said retaining means to discharge the package over a certain path, control means at the weighing station for actuating said movable member, means operated by said movable member for actuating said retaining means to discharge the package over another path, and means controlled upon the discharge of the package for resetting the apparatus.

16. An apparatus of the character described comprising a weighing station, means for delivering a package or other article to the weighing station, a movable chute for the discharge of certain of the packages over a certain path, a chute for the discharge of other of the packages over another path after the actuation of said movable chute, reversible means for actuating said movable chute, means for retaining the package upon said weighing station, means controlled by certain of the packages at the weighing station for actuating said retaining means to release the package for discharge over said movable chute, means controlled by other of the packages at said weighing station for starting operation of said reversible means to actuate said movable chute, means controlled by said movable chute for actuating said retaining means and stopping the operation of said actuating means, means operated by the package traversing said movable chute for returning said retaining means to operative position, and means operated by the package traversing the second chute for reversing said actuating means and resetting said retaining means.

17. An apparatus of the character described comprising a weighing station, a movable conveyor for delivering packages or other articles to the weighing station, an electric motor including the circuit therefor for actuating said conveyor, means associated with the conveyor and actuated by the packages thereon for controlling the circuit of said motor, means for controlling the movement of the package from said weighing station, electrical means including the circuits therefor for actuating said movement controlling means, means actuated by the packages for controlling the circuits of said electrical means, and means actuated upon the resetting movement of said movement controlling means for controlling the circuit of said motor.

18. An apparatus of the character described comprising a weighing station, means for retaining a package or other article on said weighing station, an electrically operated actuating device therefor including circuits, movable means for directing the packages over different paths, an electrically operated actuating device therefor including circuits, means at the weighing station actuated by the package for controlling the circuit of said first named electrically operated device, means at the weighing station actuated by the package for controlling the circuit of said second-named electrically operated device, and means actuated by the package directing means for controlling the circuit of said first-named electrically operated device.

19. An apparatus of the character described comprising a weighing station, means for retaining a package or other article on said weighing station, an electrically-operated actuating device therefor including circuits, means for directing the packages from said weighing station over different paths, an electrically-operated device therefor including circuits, control means at the weighing station actuated by a package of full weight for closing the circuit of said first-named device, a time-delayed relay for controlling the circuit of said second-named device, means at the weighing station actuated by the package for controlling the circuit of said relay, means operated by the movement of the package-directing means for also closing the circuit of said first-named device, and circuit controlling means disposed in the discharge paths of said packages for controlling said circuits to reset the apparatus.

20. An apparatus of the character described comprising a weighing station, a member for retaining a package or other article thereon, an electromagnetic actuator including circuits therefor, a movable chute for the discharge of a full weight package from said station over one path, a chute for the discharge of an underweight package from said station over another path, a reversible motor including circuits for actuating said movable chute, control means at the weighing station for closing the circuit of said electromagnetic actuator in the presence of a full weight package, control means at the weighing station including a time-delayed relay for closing the circuit of said motor to cause rotation therefor in a direction to open said movable chute and allow the discharge of the underweight package, control means actuated by said movable chute for closing the circuit of said electromagnetic actuator and opening the circuit of said motor, control means on said movable chute actuated by the package for opening the circuit of said electromagnetic actuator, control means on said second chute actuated by the package for closing the circuit for movement of the motor in the reverse direction, and control means operated by said movable chute for opening the motor circuit at the completion of the chute closing movement.

21. An apparatus of the character described comprising a movable conveyor, actuating means for said conveyor, a weighing station for receiving articles or packages from said conveyor, means operated at said station for controlling the discharge of an article or package therefrom, resetting means therefor, means controlled by an article on the conveyor for stopping the operation of the conveyor as each article thereon attains a position to be delivered, means controlled by the resetting operation of said discharge controlling means for starting the operation of the conveyor to discharge the article, and means under control of the article being delivered to the weighing station for maintaining said conveyor in operation when said other conveyor-controlling means are in conveyor stopping position.

22. An apparatus of the character described comprising a weighing station, a movable conveyor having actuating means, means actuated by a package on the conveyor for stopping said actuating means as said package attains a point contiguous to said weighing station, means under control of said station for controlling the discharge of packages over different paths, means operated by the packages passing over said paths for resetting said discharge controlling means, and means actuated by the resetting operation for controlling said first-named actuating means to start the conveyor operation.

23. An apparatus of the character described comprising weighing means, means for retaining a package thereon, means operated by said weighing means for actuating said retaining means to discharge the package over a given path, means for diverting a package over another path, means operated by a package at the weighing means for controlling said diverting means, means operated by said diverting means for actuating said retaining means, and control means actuated by the packages traversing said paths for resetting the apparatus.

24. An apparatus of the character described comprising a weighing station, a plurality of discharge paths from said station, means operated at said station for controlling the path of discharge of the articles or packages, means for retaining an article or package upon the weighing station, actuating means therefor, means controlled from said station and means controlled by operation of said first-named means for operating said actuating means to retract said retaining means, means actuated by the discharge of a package over one of said paths for controlling said actuating means to return the retaining means to operative position, and means actuated by the discharge of a package over the other path for resetting said first-named means and returning the retaining means to operative position.

25. An apparatus of the character described comprising a weighing station, a plurality of discharge paths from said station, means for normally retaining an article or package upon the weighing station, electro-magnetic means for retracting said retaining means, parallel circuits for said electro-magnetic means, control devices in series in one of said parallel circuits associated respectively with said weighing station to be operated thereby and with one of said discharge paths to be operated by the package discharged thereover for energizing and deenergizing said electro-magnetic means, means controlled from said station for diverting the package over the other path, and a control device in the other of said parallel circuits controlled by the operation of said last-named means for actuating said retaining means.

26. An apparatus of the character described comprising a weighing station, a discharge chute for receiving an article or package from the weighing station, means for retaining an article or package upon the weighing station and normally biased to operative position, electro-magnetic means for retracting said retaining means, a circuit therefor, and control devices in series in said circuit associated respectively with said weighing station to be operated thereby and with said chute to be operated by the package discharged thereover for energizing and deenergizing said electro-magnetic means, and a circuit connection between said devices forming therewith a holding means for maintaining said electro-magnetic means energized until the last named device is actuated.

27. An apparatus of the character described comprising a weighing station, a member for retaining a package or other article thereon, an electro-magnetic actuator therefor including parallel circuits for the same, a movable chute for the discharge of a package of a given weight from said station over one path, a chute for the discharge of packages of other weights from said station over another path, reversible electrical means including the circuits thereof for actuating said movable chute, control means responsive to said given weight for closing one of the parallel circuits of said electro-magnetic actuator, control means on said movable chute actuated by the package for opening said parallel circuit, holding means included in said circuit for maintaining said actuator energized until operation by said second control means, control means at the weighing station including a time-delay relay for closing the circuit of said electrical actuating means to open the movable chute and allow the discharge of a shunted package, control means in the second parallel circuit actuated by the movable chute for closing said circuit to actuate the retaining member, control means actuated by the movable chute to open the circuit of said electrical actuating means, control means on said second chute actuated by the package for controlling the circuit of the electrical actuating means to reverse the action thereof, holding means included in said circuits for maintaining operation of said electrical actuating means in both directions of the chute movement, and control means operated by said movable chute for opening the circuit of said electrical actuating means at the completion of the chute closing movement.

WILLIAM J. LUECKEL.